United States Patent
Yang et al.

(10) Patent No.: US 10,155,267 B1
(45) Date of Patent: Dec. 18, 2018

(54) AUTOMOBILE HUB LATHE FIXTURE

(71) Applicant: CITIC Dicastal CO., LTD, Hebei (CN)

(72) Inventors: Jinling Yang, Hebei (CN); Li Yang, Hebei (CN); Jiansheng Wang, Hebei (CN); Naizheng Hu, Hebei (CN)

(73) Assignee: CITIC DICASTAL CO., LTD. (CN)

( * ) Notice: Subject to any disclaimer, the term of this patent is extended or adjusted under 35 U.S.C. 154(b) by 0 days.

(21) Appl. No.: 15/673,571

(22) Filed: Aug. 10, 2017

(30) Foreign Application Priority Data

Jun. 13, 2017 (CN) .......................... 2017 1 0443133

(51) Int. Cl.
*B23B 31/18* (2006.01)

(52) U.S. Cl.
CPC .......... *B23B 31/18* (2013.01); *B23B 2215/08* (2013.01); *Y10T 279/18* (2015.01)

(58) Field of Classification Search
CPC ... B23B 31/18; B23B 2215/08; Y10T 279/18; Y10T 279/188
See application file for complete search history.

(56) References Cited

U.S. PATENT DOCUMENTS

| | | | | |
|---|---|---|---|---|
| 4,127,224 A | * | 11/1978 | Newman, Sr. .......... | B23B 31/18 226/196.1 |
| 5,464,233 A | * | 11/1995 | Hanai ................ | B23B 31/16229 279/106 |
| 5,820,137 A | * | 10/1998 | Patterson .......... | B23B 31/16241 279/141 |
| 5,848,795 A | * | 12/1998 | Masatsugu .......... | B23B 31/1261 279/137 |
| 6,305,697 B1 | * | 10/2001 | Tebbe ..................... | B23B 31/18 279/107 |
| 7,204,493 B1 | * | 4/2007 | Gatton ..................... | B23B 5/28 157/16 |
| 2007/0273108 A1 | * | 11/2007 | Kitatsuru ............. | B23B 31/185 279/106 |

* cited by examiner

*Primary Examiner* — Eric A Gates
(74) *Attorney, Agent, or Firm* — Zheng Liu; Weintraub Tobin

(57) ABSTRACT

The invention discloses an improved automobile hub lathe fixture. A central positioning pin (2) is arranged in a fixture body center sleeve, wheel lip positioning pins (3) are arranged on the same pitch circle of a fixture body, clamping jaws (4) are connected to supports (5) via hinge pins (6), the supports (5) and the fixture body (17) frame are casted into a whole, connecting screws (8) are fixed at the lower ends of the clamping jaws (4) via connecting nuts (7), lifting pins (9) are arranged in guide sleeves, the bottoms of the clamping jaws (4) are connected to a fixture body frame by tension springs (10), a three-leaf disc cam (11) is arranged on top half of the gear rotating shaft (13), the gear rotating shaft (13) is arranged in a guide sleeve (12) of the fixture body frame, and a rack ejector rod (14) is connected with a cylinder (15). The improved automobile hub lathe fixture can save the manpower and materials and further improve the production efficiency.

1 Claim, 3 Drawing Sheets

AUTOMOBILE HUB LATHE FIXTURE

RELATED APPLICATION

This application claims priority to Chinese Patent Application No. 201710443133.X, filed on Jun. 13, 2017, which is hereby incorporated by reference in its entirety.

FIELD OF THE INVENTION

The present invention relates to a fixture, and specifically, relates to an improved automobile hub lathe fixture.

BACKGROUND OF THE INVENTION

In the automobile hub lathe machining production, an automobile hub needs to be positioned and clamped for turning, and clamping jaws of a common hydraulic lathe fixture are often damaged due to too large hydraulic pressure.

SUMMARY OF THE INVENTION

An improved automobile hub lathe fixture includes a central positioning pin, wheel lip positioning pins, clamping jaws, supports, hinge pins, connecting nuts, connecting screws, lifting pins, tension springs, a three-leaf disc cam, a guide sleeve, a gear rotating shaft, a rack ejector rod, a cylinder and a fixture body frame.

The central positioning pin is arranged in a fixture body center sleeve, the wheel lip positioning pins are arranged on the same pitch circle of a fixture body, the clamping jaws are connected to the supports via the hinge pins, the supports and the fixture body frame are casted into a whole, the connecting screws are fixed at the lower ends of the clamping jaws via the connecting nuts, the lifting pins are arranged in guide sleeves, the bottoms of the clamping jaws are connected to the fixture body frame by the tension springs, and the tension springs keep the clamping jaws in a splayed state when the clamping jaws are not clamping a workpiece. The three-leaf disc cam is arranged on top half of the gear rotating shaft, the gear rotating shaft is arranged in the guide sleeve of the fixture body frame, and the rack ejector rod is connected with the cylinder.

In the present invention, a piston rod of the cylinder drives the rack ejector rod to move linearly, the rack ejector rod drives the gear rotating shaft to rotate via tooth connection, the reducing characteristic of a cam contact face is realized by horizontal rotation of the three-leaf disc cam, a limiting raised part is added to the three-leaf disc cam to prevent excessive rotation of the three-leaf disc cam so as to complete the ejection function of the lifting pins, and the clamping jaws rotate in the hinge pins to clamp an automobile hub.

The improved automobile hub lathe fixture of the present invention can save the manpower and materials and further improve the production efficiency.

Figure 1:
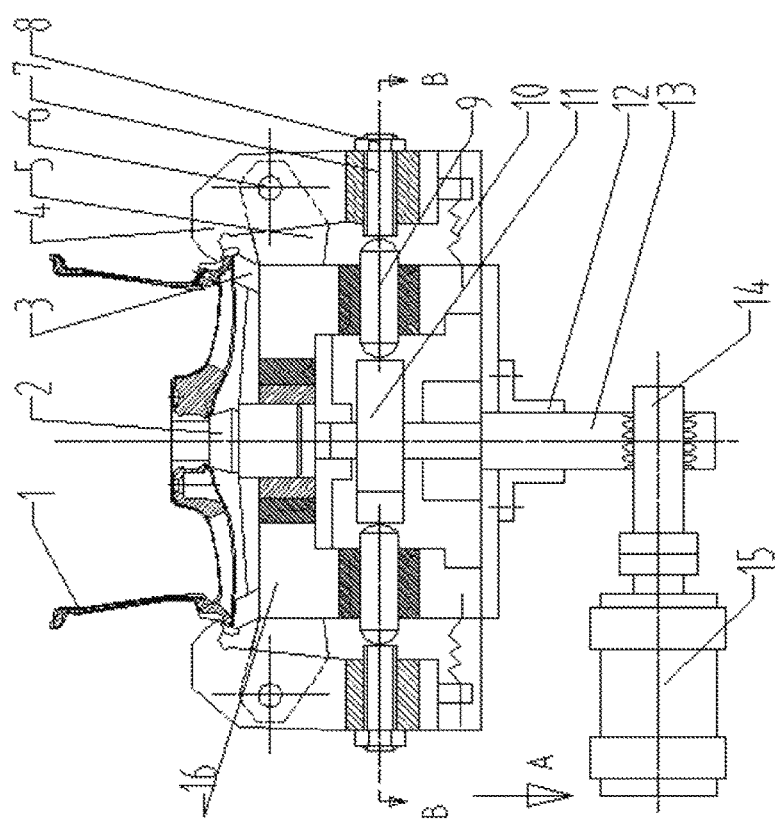
FIG. 1 is a schematic front view of an improved automobile hub lathe fixture.
Figure 2:
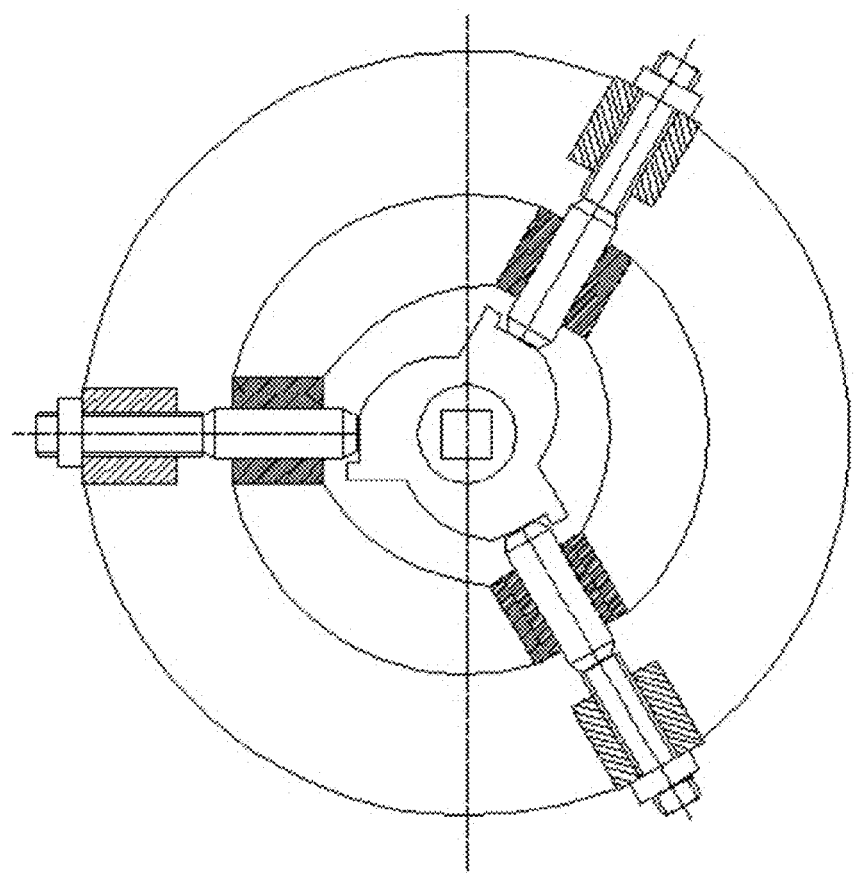
FIG. 2 is a schematic top view of the improved automobile hub lathe fixture.
Figure 3:
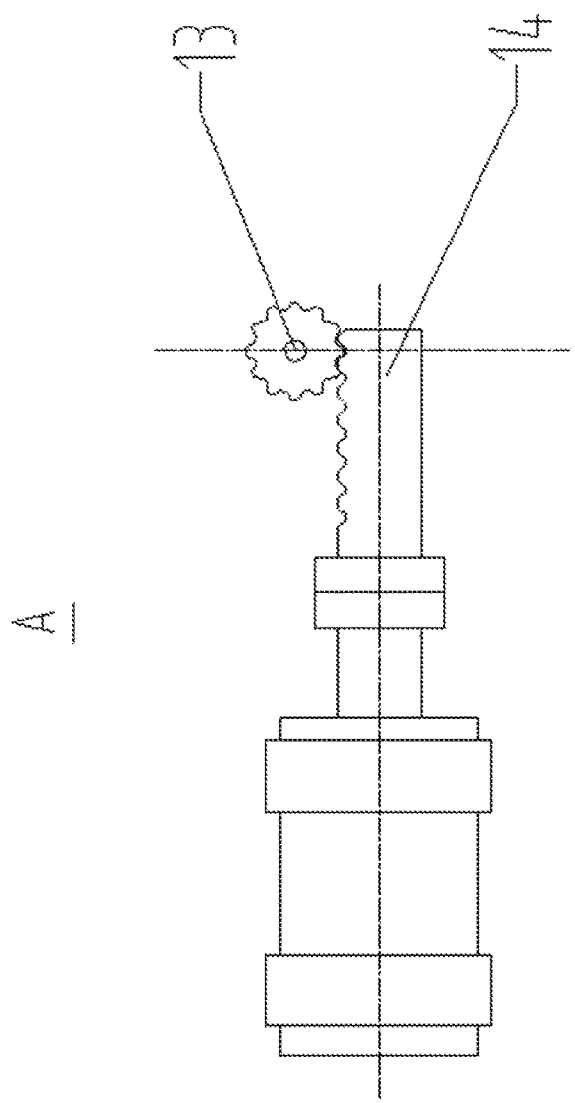
FIG. 3 is a partial schematic diagram of the improved automobile hub lathe fixture.

In which: 1—automobile hub, 2—central positioning pin, 3—wheel lip positioning pin, 4—clamping jaw, 5—support, 6—hinge pin, 7—connecting nut, 8—connecting screw, 9—lifting pin, 10—tension spring, 11—three-leaf disc cam, 12—guide sleeve, 13—gear rotating shaft, 14—rack ejector rod, 15—cylinder, 16—fixture body frame.

DETAILED DESCRIPTION OF THE EMBODIMENTS

An improved automobile hub lathe fixture includes a central positioning pin 2, wheel lip positioning pins 3, clamping jaws 4, supports 5, hinge pins 6, connecting nuts 7, connecting screws 8, lifting pins 9, tension springs 10, a three-leaf disc cam 11, a guide sleeve 12, a gear rotating shaft 13, a rack ejector rod 14, a cylinder 15 and a fixture body frame 16.

The central positioning pin 2 is arranged in a fixture body center sleeve, the wheel lip positioning pins 3 are arranged on the same pitch circle of a fixture body 17, the clamping jaws 4 are connected to the supports 5 via the hinge pins 6, the supports 5 and the fixture body 17 frame are casted into a whole, the connecting screws 8 are fixed at the lower ends of the clamping jaws 4 via the connecting nuts 7, the lifting pins 9 are arranged in guide sleeves, the bottoms of the clamping jaws 4 are connected to the fixture body frame by the tension springs 10, and the tension springs 10 keep the clamping jaws 4 in a splayed state when the clamping jaws 4 are not clamping a workpiece. The three-leaf disc cam 11 is arranged on top half of the gear rotating shaft 13, the gear rotating shaft 13 is arranged in the guide sleeve 12 of the fixture body 17 frame, and the rack ejector rod 14 is connected with the cylinder 15.

In the present invention, a piston rod of the cylinder 15 drives the rack ejector rod 14 to move linearly, the rack ejector rod 14 drives the gear rotating shaft 13 to rotate via tooth connection, the reducing characteristic of a cam contact face is realized by horizontal rotation of the three-leaf disc cam 11, a limiting raised part is added to the three-leaf disc cam 11 to prevent excessive rotation of the three-leaf disc cam 11 so as to complete the ejection function of the lifting pins 9, and the clamping jaws 4 rotate in the hinge pins 6 to clamp an automobile hub 1.

When the clamping jaws 4 do not clamp a workpiece, the clamping jaws 4 are splayed via the tension springs 10. The automobile hub 1 is positioned on the fixture by using the central positioning pin 2 and the wheel lip positioning pins 3, then the cylinder 15 is started by using a pedal pneumatic switch so that the rack ejector rod 14 moves linearly to drive the gear rotating shaft 13 to rotate, the pitch circle of the special-shaped cam 3 is enlarged under the drive of horizontal rotation of the three-leaf disc cam 11, the lifting pins 9 are in contact with the connecting screws 8 in an outward ejection manner, and the clamping jaws 4 rotate in the hinge pins 6 to clamp the automobile hub 1.

After the automobile hub 1 is turned, the cylinder 15 is shut down by using the pedal pneumatic switch so that the rack ejector rod 14 moves linearly to drive the gear rotating shaft 13 to rotate, then the pitch circle of the special-shaped cam 3 is reduced under the drive of horizontal rotation of the three-leaf disc cam 11, and under the tension of the tension springs 10, the clamping jaws 4 rotate in the hinge pins 6 to loosen the automobile hub 1, thus completing a working cycle.

The invention claimed is:

1. An improved automobile hub lathe fixture, comprising a central positioning pin, wheel lip positioning pins, clamping jaws, supports, hinge pins, connecting nuts, connecting screws, lifting pins, tension springs, a three-leaf disc cam, a guide sleeve, a gear rotating shaft, a rack ejector rod, a cylinder and a fixture body frame, characterized in that the central positioning pin is arranged in a fixture body center sleeve, the wheel lip positioning pins are arranged on the same pitch circle of a fixture body, the clamping jaws are connected to the supports via the hinge pins, the supports and the fixture body frame are casted into a whole, the connecting screws are fixed at the lower ends of the clamping jaws via the connecting nuts, the lifting pins are arranged in guide sleeves, the bottoms of the clamping jaws are connected to the fixture body frame by the tension springs, the three-leaf disc cam is arranged on top half of the gear rotating shaft, the gear rotating shaft is arranged in the guide sleeve of the fixture body frame, and the rack ejector rod is connected with the cylinder.

* * * * *